(12) United States Patent
McGlothlin

(10) Patent No.: US 7,311,331 B2
(45) Date of Patent: Dec. 25, 2007

(54) METHOD AND APPARATUS FOR RAISING AND LOWERING A TRAILER

(75) Inventor: Danny McGlothlin, Bradford, AR (US)

(73) Assignee: MCB Sales & Installation Services, Inc., Bradford, AR (US)

( * ) Notice: Subject to any disclaimer, the term of this patent is extended or adjusted under 35 U.S.C. 154(b) by 252 days.

(21) Appl. No.: 10/678,886

(22) Filed: Oct. 3, 2003

(65) Prior Publication Data

US 2005/0073130 A1   Apr. 7, 2005

(51) Int. Cl.
*B60D 1/66* (2006.01)
*B60S 9/02* (2006.01)

(52) U.S. Cl. ............. 280/765.1; 280/475; 280/766.1

(58) Field of Classification Search .. 280/6.153–6.156, 280/763.1, 764.1, 765.1, 766.1; 254/418, 254/419, 424, 425; 33/562, 563, 566; 408/3, 408/16
See application file for complete search history.

(56) References Cited

U.S. PATENT DOCUMENTS

| | | | | |
|---|---|---|---|---|
| 2,959,395 A * | 11/1960 | Strack et al. | ............ | 254/419 |
| 3,189,322 A * | 6/1965 | Hadek | ............ | 254/425 |
| 3,201,087 A * | 8/1965 | Dalton | ............ | 254/419 |
| 3,565,396 A * | 2/1971 | Spear | ............ | 254/424 |
| 3,592,443 A | 7/1971 | Budrow et al. | | |
| 3,784,160 A * | 1/1974 | Phillips | ............ | 254/425 |
| 3,859,002 A * | 1/1975 | Sauey | ............ | 408/16 |
| 4,023,907 A * | 5/1977 | Chang | ............ | 356/138 |
| 4,097,840 A | 6/1978 | Chappelle | | |
| 4,129,322 A * | 12/1978 | Kuntz, Jr. | ............ | 254/419 |
| 4,466,637 A * | 8/1984 | Nelson | ............ | 280/766.1 |
| 4,640,019 A * | 2/1987 | Paley | ............ | 33/563 |
| 4,863,184 A * | 9/1989 | Mena | ............ | 280/475 |
| 5,040,580 A * | 8/1991 | Hufford | ............ | 144/144.1 |
| 5,050,845 A * | 9/1991 | Aline et al. | ............ | 254/419 |
| 5,205,586 A * | 4/1993 | Tallman | ............ | 280/764.1 |
| 5,575,493 A | 11/1996 | Schwartz et al. | | |
| 5,682,934 A * | 11/1997 | Rybski | ............ | 144/144.51 |
| 5,911,437 A * | 6/1999 | Lawrence | ............ | 280/766.1 |
| 6,224,103 B1 * | 5/2001 | Hatcher | ............ | 280/766.1 |
| 6,250,650 B1 | 6/2001 | Douglas | | |
| 6,260,882 B1 * | 7/2001 | Kingsbury | ............ | 280/766.1 |
| 6,598,886 B2 * | 7/2003 | Baird et al. | ............ | 280/6.155 |
| 6,623,035 B1 * | 9/2003 | Schneider | ............ | 280/766.1 |
| 7,182,367 B2 * | 2/2007 | Alguera et al. | ............ | 280/765.1 |
| 2001/0054815 A1 | 12/2001 | Barid et al. | | |
| 2002/0053794 A1 | 5/2002 | Fender | | |

* cited by examiner

*Primary Examiner*—Lesley D. Morris
*Assistant Examiner*—Marc A. Scharich
(74) *Attorney, Agent, or Firm*—Speed Law Firm; Kyla D. Cummings; Gary N. Speed

(57) ABSTRACT

A combination is disclosed having a trailer, telescoping support members, and a drive. The drive has a motor and a drive shaft, and the drive shaft has a first end portion affixed to a first cross member and a second end portion affixed to a second cross member. The first cross member is operably connected to means for moving the support members between raised and lowered positions. To install the drive on a trailer with a cross member, a segment of the cross member is removed and both ends of the drive shaft are affixed to portions of the remaining cross member. A kit having a drive and a template may be provided for retrofitting trailers. The template is a sheet that may be positioned on a cross member to determine locations for cuts and holes.

18 Claims, 4 Drawing Sheets

METHOD AND APPARATUS FOR RAISING AND LOWERING A TRAILER

BACKGROUND OF THE INVENTION

The present invention relates generally to powered jacking devices and more particularly to powered landing gear for trailers.

Raising and lowering supports, such as landing gear or supports for trailers, can be a time-consuming and tiring physical task. It is known in the art to provide powered landing gear to eliminate the need for manually rotating a jacking device. The devices provide some advantages and benefits over relying simply on manual labor to provide the force needed to power jacking devices that raise and lower trailer landing gear. Still, prior attempts have met with very limited success because of a number of drawbacks. For example, prior art devices are typically complex, expensive, and difficult to install. Prior art devices have often been unreliable and are typically difficult to service, repair, or replace when problems arise. Prior art devices have often been connected to and relied upon the manual drive gearboxes of trailers, which can be undesirable for a number of reasons. For example, intermeshing a powered drive with a manual drive gearbox can make installation undesirably complex and time consuming. Further, intermeshing the powered drive with the manual drive gearbox can also impair the functionality of the manual jacking device and interfere with manual operation of the jacking device if that becomes necessary or desirable. Further still, the gearing used in different manual jacking devices can vary widely from device to device, so relying upon the gearing of different manual drive gear boxes can lead to an undesirable loss of predictability of performance. The complicated nature of the prior art devices and their methods of attachment have often made it undesirable for anyone other than a skilled technician to attempt retrofitting existing trailers with the devices.

SUMMARY OF THE INVENTION

It is therefore an object of the present invention to provide a simple, reliable, inexpensive, powered jacking device that is easy to install and use.

It is a further object of the present invention to provide a device, kit, and method of installation of the above type that makes it easy to retrofit existing trailers.

It is a still further object of the present invention to provide a trailer that incorporates the simple, reliable, inexpensive jacking device of the present invention.

It is a still further object of the present invention to provide a device, kit, and method of installation of the above type that does not interfere with the operation of manual jacking devices.

It is a still further object of the present invention to provide a device, kit, and method of installation of the above type that does not rely upon the gearing of manual jacking devices to supply power to raise or lower supports or landing gear.

It is a still further object of the present invention to provide a kit that is inexpensive and easy to use.

It is a still further object of the present invention to provide a device, kit, and method of installation of the above type that may use a trailer's and vehicle's existing wiring system.

It is a still further object of the present invention to provide a device, kit, and method of installation of the above type that does not require a separate wiring and electrical systems.

It is a still further object of the present invention to provide a device, kit, and method of installation of the above type that is relatively small and light.

Toward the fulfillment of these and other objects and advantages, a combination is disclosed having a trailer, telescoping support members, and a drive. The drive has a motor and a drive shaft, and the drive shaft has a first end portion affixed to a first cross member and a second end portion affixed to a second cross member. The first cross member is operably connected to means for moving the support members between raised and lowered positions. To install the drive on a trailer with a cross member, a segment of the cross member is removed and both ends of the drive shaft are affixed to portions of the remaining cross member sections. A kit having a drive and a template may be provided for retrofitting trailers. The template is a sheet that may be positioned on a cross member to determine locations for cuts and holes.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
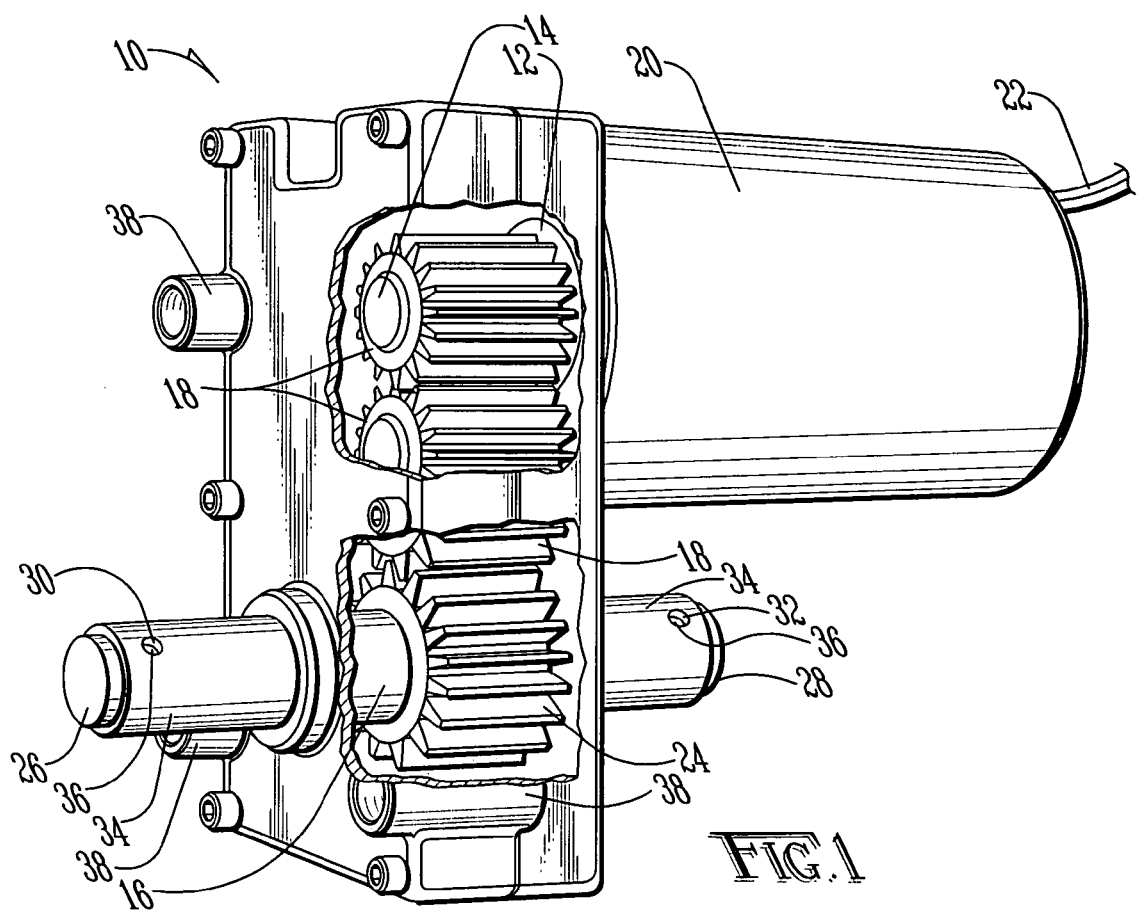
FIG. 1 is a partial cutaway, side elevation view of a drive of the present invention.

Referring to FIG. 1, the reference numeral 10 refers in general to a drive of the present invention. The drive 10 has a motor 12, drive shafts 14 and 16, one or more gears 18, and a housing 20.

The motor 12 is preferably a reversible electric motor and is more preferably a 6 horsepower, 12 volt DC, reversible electric motor. It is preferably capable of delivering 400 in.-lbs. output torque at 16 amps and 20 rpm, 600 in.-lbs. output torque at 25 amps and 17 rpm, and 800 in.-lbs. output torque at 32 amps and 15 rpm. The leads 22 and other electrical wiring are preferably a minimum of 14 gauge wiring and are more preferably 10 gauge. It is of course understood that any number of different sizes and types of motors may be used depending upon the desired characteristics.

Drive shaft 14 is operably connected to and extends from the motor 12. A gear 18 is affixed to or formed into an end portion of drive shaft 14. Similarly, a gear 24 is affixed to or formed into an intermediate portion of drive shaft 16. Drive shafts 14 and 16 are aligned substantially parallel. One or more gears 18 operably connect drive shaft 14 to drive shaft 16 so that drive shaft 16 rotates at a much lower rpm rate than drive shaft 14. The gears 18 are selected to provide a gear ratio from drive shaft 14 to drive shaft 16 that is preferably substantially within a range of from approximately 150:1 to approximately 60:1, that is more preferably substantially within a range of from approximately 125:1 to approximately 85:1, and that is most preferably approximately 105:1.

Drive shaft 16 preferably has a diameter of approximately 0.75 inches and has a length of approximately 5.4 inches. The drive shaft 16 has two output ends or end portions 26 and 28. Holes 30 and 32 pass through end portions 26 and 28 of the drive shaft 16. Holes 30 and 32 are aligned so that an axis of each hole is preferably perpendicular to and intersects an axis of drive shaft 16. Each hole 30 or 32 preferably has a diameter of approximately 0.375 inches, and the axis of the hole is preferably approximately 0.4 inches from its respective end. The holes 30 and 32 are separated by a distance that is preferably substantially within a range of from approximately 3 inches to approximately 6 inches, that is more preferably substantially within a range of from approximately 4 inches to approximately 5 inches, and that is most preferably approximately 4.8 inches. Bushings 34 are provided and fit closely but rotatably over the output ends 26 and 28. Holes 36 are provided in each bushing 34, sized and disposed to line up with holes 30 and 32 in output ends 26 and 28. Each bushing 34 has a length that is approximately 1.38 inches. The wall thickness of the bushing 34 is selected based upon the desired application as will be described in more detail below.

Housing 20 protects the drive 10 components and provides means for affixing the drive 10 to a trailer. The motor 12, drive shaft 14, and gears 18 are disposed within the housing 20. At least a portion of drive shaft 16, including gear 24, is disposed within housing 20, and portions of drive shaft 16, including the end portions 26 and 28 and holes 30 and 32, are disposed outside the housing 20. Approximately 1.58 inches of the drive shaft 16 extends outside of the housing 20 on both sides of the housing. Threaded mounting holes 38 are disposed on the housing 20, with axes of the mounting holes 38 disposed substantially parallel to axes of the drive shafts 14 and 16. It is of course understood that the housing 20 made be made of any number of different pieces that may be fastened or affixed to one another in any number of different ways. An additional, protective outer housing (not shown) may be used to provide additional protection to the drive 10 and to provide additional shielding of the moving parts associated therewith. Any number of different shapes, sizes, and configurations may be used for the additional housing. The additional outer housing will typically have two openings to allow the cross member 56 to pass through.

Figure 2:
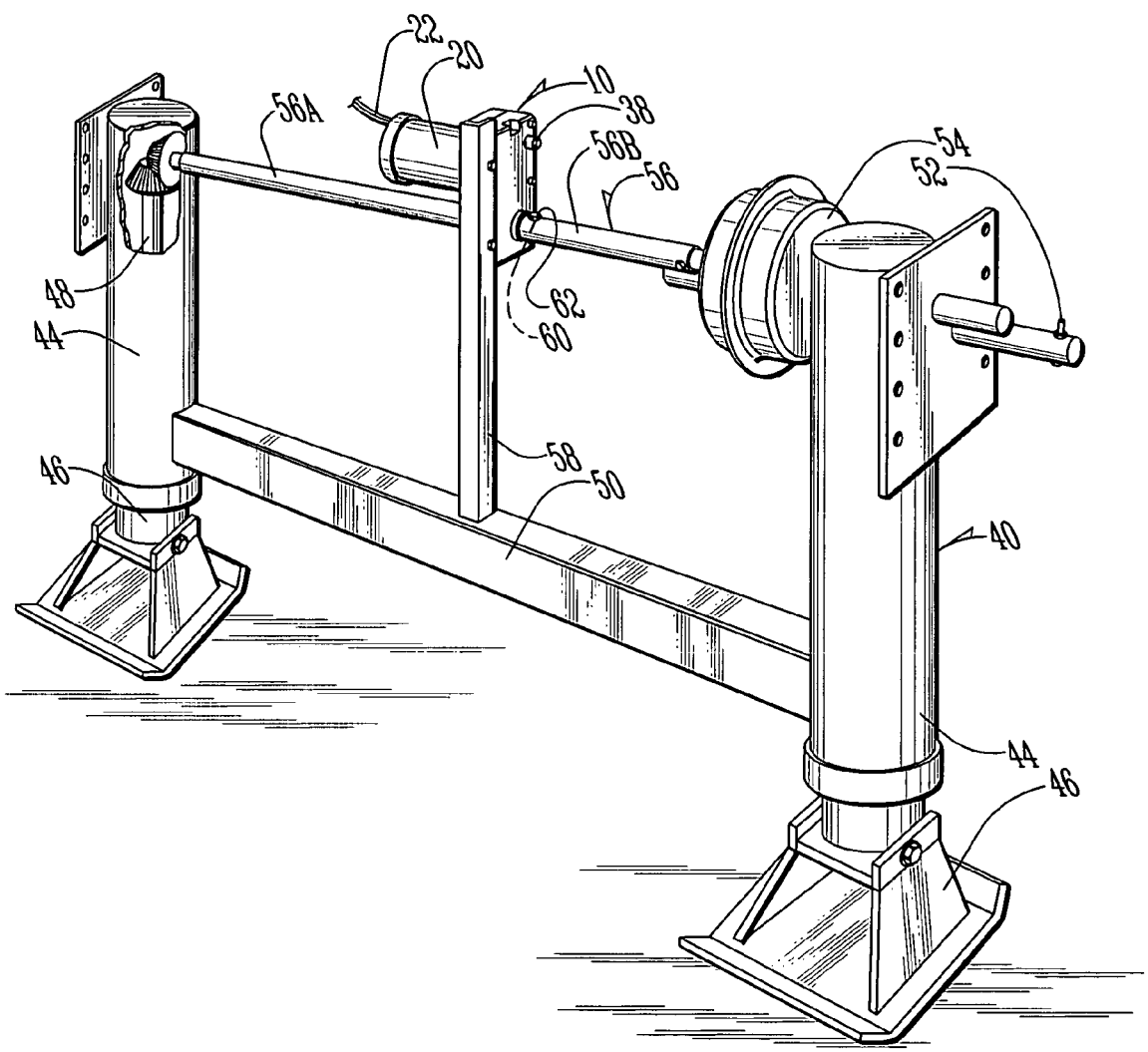
FIG. 2 is a partial cutaway, perspective view of a combination of the present invention with a trailer omitted for clarity of presentation.

FIG. 2 depicts the drive 10 of the present invention affixed to a common configuration for a trailer support or landing gear 40. The trailer 42 is not shown in this figure for clarity of presentation. In a typical landing gear 40, one or more pairs of upper and lower support members 44 and 46 are provided. The upper support member 44 is affixed to the trailer 42. The lower support member 46 is telescopically received within the upper support member 44. Means 48, such as a ball screw device or other suitable gear drive mechanism, are provided for raising or lowering the lower support member 46 between raised and lowered positions relative to the upper support member 44. One or more rigid struts 50 may be provided, in any number of different configurations for rigidly affixing the upper support members 44 to the trailer 42 and each other for stability. A wide variety of different types and configurations of struts 50 may be used. In a typical, manually driven, landing gear 40, a manual drive shaft 52 is provided and is coupled to a gear reducer box 54 that operably connects the manual drive shaft 52 to a cross member 56. The cross member 56 is operably connected to the gear drive mechanism 48 for each pair of upper and lower support members 44 and 46 so that rotation of the cross member 56 moves the lower support members 46 between raised and lowered positions. The cross member 56 is preferably a pipe, is more preferably a pipe having an outside diameter that is substantially within a range of from approximately 1 inch to approximately 1.5 inches, and is most preferably a pipe having an outside diameter that is approximately 1.25 inches. The use of smaller drive shaft output ends 26 and 28 in combination with bushings 34 allows the drive 10 to be used in connection with a wide variety of cross members of different sizes and cross sectional configurations.

A rigid member 58, such as an angle iron, is affixed to a strut 50, to the trailer 42, or some other suitable object that is stationary relative to the trailer 42. The drive 10 is rigidly affixed to the angle iron 58, such as by passing bolts through holes in the angle iron 58 and tightening them into the threaded mounting holes 38. The rigid member 58 rigidly affixes the housing 20 so that it is substantially stationary relative to the trailer 42 and cross member 56. The output ends 26 and 28 of the drive shaft 16 and associated bushings 34 are disposed inside respective sections 56A and 56B of the cross member 56. Holes 60 are provided in the cross member 56, the cross member holes 60 being aligned with holes 36 in the bushings 34 and holes 30 and 32 in the output ends 26 and 28 of the drive shaft 16. Rigid members 62, such as bolts, pass through and are secured within the holes 60, 36, 30, and 32 in the cross member sections 56A and 56B, the bushings 34, and the output ends 26 and 28 of the drive shaft 16. The output ends 26 and 28 of the drive shaft 16 may be affixed to the cross member sections 56A and 56B at any number of locations along the length of the cross member 56, so the drive 10 may be positioned in any number of locations. The use of the drive shaft 16 with two output ends 26 and 28 and the use of a plurality of threaded mounting holes 38 allows great flexibility in the positioning of the drive 10 relative to the trailer 42 and cross member 56. For example, the motor 12 may be positioned above, below, in front of, or behind the cross member 56. Similarly the motor 12 may be positioned to left or right of the gears 18.

Figure 3:
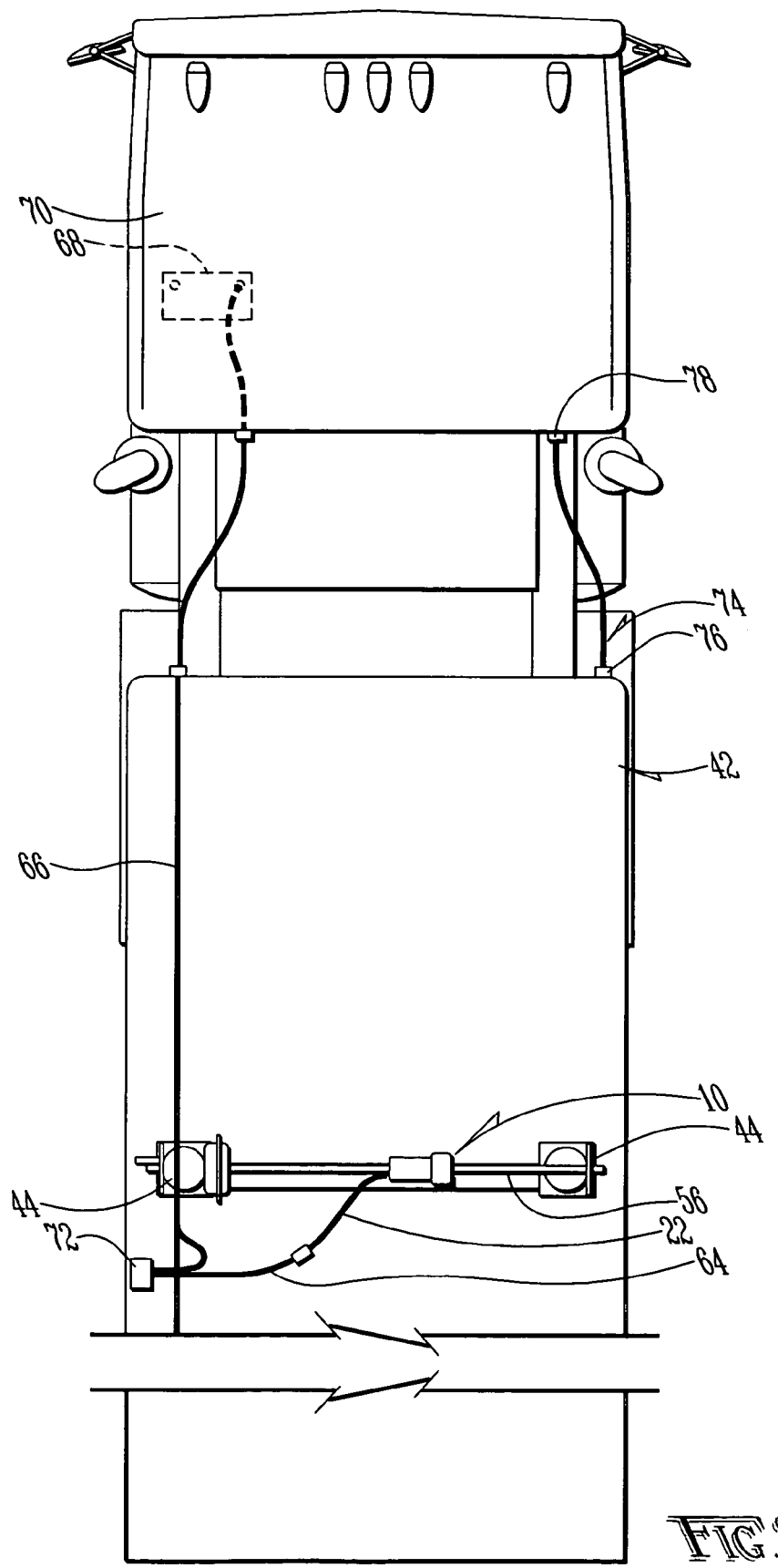
FIG. 3 is an overhead, schematic view of a combination of the present invention.

As seen in FIG. 3, the leads 22 of the drive 10 are connected to a wiring harness 64. The wiring harness will typically include wiring of the desired gauge, an insulated cover, and suitable connectors. As mentioned above, the wiring is preferably a minimum of 14 gauge and is more preferably 10 gauge. The wiring harness 64 is spliced into the existing electrical wiring 66 of a trailer 42 so that it may be powered by the 12 volt power supply 68 of the tractor or towing vehicle 70 when the electrical wiring 66 of the trailer 42 is connected to the electrical system of the tractor 70. A switch 72, such as a toggle switch is included in and interconnects the wiring in the wiring harness 64. The switch 72 may be positioned in any number of locations as desired. The switch 72 will typically be positioned near the landing gear 40 at a side of the trailer 42. It is of course understood that the switch 72 may be positioned in any number of desired locations, including but not limited to various locations about the trailer 42 and about or in the tractor. Although a manual, toggle switch 72 is preferred, it is of course understood that any number of different controls may be used, including but not limited to electronic controls and wired or wireless controls. Although not required, to insure that the electrical wiring 66 of the trailer 42 is properly grounded, it is preferred to use a grounding device 74. The grounding device 74 may be something as simple as a short segment of conductive wiring 76 with a clamp or clip 78 affixed to one end. An end of the wiring is affixed to a metal portion of the trailer 42. After the trailer 42 is connected to the tractor or towing vehicle 70, the clip 78 is temporarily affixed to a metal portion of the tractor or towing vehicle 70.

Figure 4:
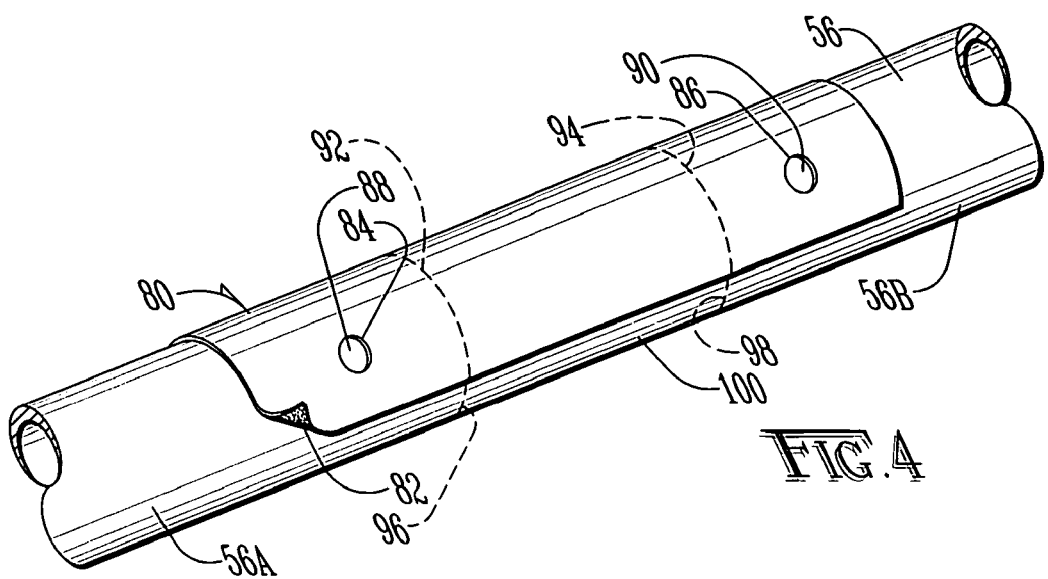
FIG. 4 is a side elevation view of a template of the present invention.

To install a drive 10 of the present invention, such as in a retrofitting situation, a template 80 is preferably used (FIG. 4). The template 80 is a rectangular, pliant, sheet material with an adhesive 82 backing. First and second indicators 84 and 86 on the sheet identify first and second locations 88 and 90 for drilling holes 60, and third and fourth indicators 92 and 94 on the sheet identify third and fourth locations 96 and 98 for making cuts. The first and second locations 88 and 90 are separated by a first distance that is preferably substantially within a range of from approximately 3 inches to approximately 6 inches, that is more preferably substantially within a range of from approximately 4 inches to 5 inches, and that is most preferably approximately 4.8 inches. The third and fourth locations 96 and 98 are separated by a second distance that is preferably substantially within a range of from approximately 1 inch to approximately 5 inches, that is more preferably substantially within a range of from approximately 2 inches to 4 inches, and that is most preferably approximately 2.875 inches. The first and second indicators 84 and 86 are preferably holes passing through the sheet, with the center of each hole identifying the location for drilling a hole. The third and fourth indicators 92 and 94 on the sheet are preferably lines, such as dashed lines, identifying the locations for making the cuts. It is of course understood that each indicator may take any number of different forms or combinations of forms, including but not limited to lines, dots, dashes, circles, perforations, score lines, holes, indentions, contrasts in color, shading, texture, or the like.

To perform an installation, a user determines an approximate location along the length of the cross member 56 for positioning the drive 10, taking into account factors such as spacing considerations and the proximity of struts 50 or other bracing surfaces for rigidly affixing the drive 10. The user places the template 80 on the cross member 56 in the desired location. The user drills through the pipe 56 at the first location 88, creating two holes 60, with the holes 60 aligned in opposite walls of the pipe 56 at that location. Similarly, the user drills through the pipe 56 at the second location 90, creating two holes 60, with the holes 60 aligned in opposite walls of the pipe 56 at that location. The holes 60 are sized to allow a bolt 62 of the desired size to pass through the holes 60. The user makes cuts at the third and fourth locations 96 and 98 to remove a segment 100 of the cross member 56 disposed between the third and fourth indicators 92 and 94. The cut pipe segment 100 is removed, leaving first and second pipe sections 56A and 56B. The template 80 is then removed. Although it is preferred to drill the holes 60 first, the holes 60 and cuts may be made in any order desired. It is also understood that the template 80 may be removed at any time desired in the process. After the cut pipe segment 100 is removed, one output end 26 of the drive shaft 16, and a bushing 34, are placed inside the first pipe section 56A and the other output end 28 of the drive shaft 16, and a bushing 34, are placed inside the second pipe section 56B. The respective holes 60, 36, 30 and 32 in the respective pipe sections 56A and 56B, bushings 34, and output ends 26 and 28 of the drive shaft 16 are aligned, and rigid members 62, such as bolts are passed through and secured within the respective holes to affix an output end portion 26 of the drive shaft 16 to one pipe section 56A and to affix the other output end portion 28 of the drive shaft 16 to the other pipe section 56B. The wires in the wiring harness 64 are affixed to the leads 22 of the drive 10 and are spliced into the electrical wiring 66 of the trailer 42, and the switch 72 is affixed to the trailer 42 in the desired location.

If the electrical wiring of a towing vehicle 70 does not use wiring of the desired gauge, in an alternate embodiment, provisions may be made to wire the motor 12 directly to the battery 68 of the towing vehicle 70 without the need to use the existing wiring of the towing vehicle 70. In this embodiment, a separate wiring harness is connected directly to the battery 68. Wires of the harness may be routed to a rear portion of the towing vehicle 70, where a plug or other common connector is provided. If this configuration is used, the wiring harness 64 connected to the drive 10 is not spliced into the electrical wiring 66 of the trailer 42. Instead, one end of a harness 64 is connected to the drive 10 and the other end is provided with a mating plug or common connector for connecting to the front wiring harness. A switch 72 is disposed in the rear harness 64 and is affixed to the trailer 42.

The invention may take the form of a kit, the kit including a drive 10 and template 80 as described above. Additional components, such as one or more wiring harnesses 64 and one or more switches 72 may also be included in the kit. It is of course understood that any number of different components and different combinations of components may be included in the kit.

In operation, when the lower support members 46 are in a lowered position and are supporting the trailer 42 in a raised position, the towing vehicle 70 is back into place for coupling to the trailer 42. The electrical wiring 66 of the trailer 42 is connected to the electrical system of the towing vehicle 70 so that the motor 12 is powered by a 12 volt DC power source 68 from the towing vehicle 70. The user affixes the clip 78 to a metal surface of the towing vehicle 70 to alleviate potential grounding problems. The user holds or depresses the switch 72 in a first position for rotation of the drive shaft 16 in a desired direction, which in turn rotates the cross member sections 56A and 56B. The rotating cross member sections 56A and 56B are operably connected to the gear drive mechanisms 48 so that the rotation of the cross member sections 56A and 56B raises the lower support members 46 from the lowered position to the raised position, thereby lowering the trailer 42 for coupling with the towing vehicle 70. The user may start and stop the raising of the lower support members 46 as desired to make adjustments during the coupling of the trailer 42 to the towing vehicle 70. The user continues the operation, until the lower support members 46 are raised to the desired degree. When the drive 10 is acting to move the lower support members 46 from the lowered position to the raised position, the drive 10 will rotate the cross member sections 56A and 56B at a rate that is preferably greater than or equal to approximately 8 rpm, that is more preferably greater than or equal to approximately 18 rpm, and that is most preferably greater than or equal to approximately 24 rpm.

For uncoupling the trailer 42 from the vehicle 70, the user holds or depresses the switch 72 in a second direction, opposite the first direction, so that the drive shaft 16 rotates the cross member sections 56A and 56B in a direction for moving the lower support members 46 from a raised position to a lowered position. Until the lower support members 46, or the shoes or pads forming parts thereof, contact the ground, the drive 10 will rotate the cross member sections 56A and 56B at a rate that is preferably greater than or equal to approximately 8 rpm, that is more preferably greater than or equal to approximately 18 rpm, and that is most preferably greater than or equal to approximately 24 rpm. The user may start and stop the lowering of the lower support members 46 as desired to make adjustments during the un-coupling of the trailer 42 from the towing vehicle 70. Once the lower'support members 46 contact the ground so that the landing gear 40 begins to bear a load and raise a front portion of the trailer 42, the rate of rotation of the cross member sections 56A and 56B will typically be reduced. As the lower support members 46 raise the front portion of the trailer 42, the drive 10 will rotate the cross member sections 56A and 56B at a rate that is preferably greater than or equal to approximately 8 rpm, that is more preferably greater than or equal to approximately 12 rpm, and that is most preferably greater than or equal to approximately 18 rpm. The user continues this operation until the front portion of the trailer 42 has been raised to the desired level. At some point, before the towing vehicle 70 is moved away from the trailer 42, the clip 78 is detached from the towing vehicle 70, and the electrical system of the towing vehicle 70 is disconnected from the electrical wiring 66 of the trailer 42.

Other modifications, changes and substitutions are intended in the foregoing, and in some instances, some features of the invention will be employed without a corresponding use of other features. For example, although the system is described for use in connection with landing gear 40 for a trailer 42, it is understood that the system may be used in any number of different applications, including but not limited to providing for powered opening and closing of chutes, valves, tops, canopies, and the like. Similarly, the system may be used in connection with mobile or immobile applications. Also, although it is preferred that the motor 12 be powered by a 12 volt DC power source 68 already present on the towing vehicle 70, it is understood that any number of different kinds, sizes, and types of power sources may be used and that a power source may be provided as part of the system. Similarly, the motor 12 may be selected so that it may also be powered by an AC power source such as may be readily available at locations where trailers 42 are frequently coupled and uncoupled to and from towing vehicles 70. Although the output ends 26 and 28 of the drive shaft 16 are preferably placed inside cross member sections 56A and 56B and secured in place using bolts 62, it is understood that any number of different ways may be used to couple the output ends 26 and 28 of the drive shaft 16 to the cross member sections 56A and 56B. Further, although it is preferred to use a template 80 to enhance the speed and accuracy of the installation process, a template 80 need not be used. Further still, the template 80 need not take the form of a sheet, need not be pliant, and need not have adhesive 82 on any or all of a surface. Further still, although many applications will involve landing gear 40 having two sets of upper and lower support members 44 and 46, it is understood that in some applications other numbers of sets may be used, including one set or more. Of course, quantitative information is included by way of example and is not intended as a limitation as to the scope of the invention. Accordingly, it is appropriate that the invention be construed broadly and in a manner consistent with the scope of the invention disclosed.

What is claimed is:

1. A combination, comprising:
   a trailer;
   a first support member secured to said trailer;
   a second support member secured to said first support member, said second support member being telescopically received within said first support member and being movable between raised and lowered positions;
   a first cross member;
   first means for moving said second support member between said raised and lowered positions upon rotation of said first cross member, said first cross member being operably connected to said first moving means;
   a second cross member;
   a drive, said drive comprising:
      a motor; and
      a first drive shaft operably connected to said motor, said first drive shaft having first and second end portions, said first end portion being affixed to said first cross member and said second end portion being affixed to said second cross member;
   the combination further comprising:
   a third support member secured to said trailer;
   a fourth support member secured to said third support member, said fourth support member being telescopically received within said third support member and being movable between raised and lowered positions; and
   second means for moving said fourth support member between said raised and lowered positions upon rotation of said second cross member, said second cross member being operably connected to said second moving means,
   wherein the first end portion of the first drive shaft is affixed to an end of the first cross member and the second end portion of the first drive shaft is affixed to an end of the second cross member.

2. The combination of claim 1, wherein:
   said first cross member comprises a first pipe, said first pipe having first and second apertures passing therethrough;
   said first end portion of said first drive shaft having a first aperture passing therethrough; and
   the combination further comprising, a first rigid member, said first rigid member being affixed within said first and second apertures of said first pipe and within said first aperture of said first end portion of said first drive shaft.

3. The combination of claim 1, wherein said first cross member comprises a first pipe having an outer diameter that is substantially within a range of from approximately 1 inch to approximately 1.5 inches.

4. The combination of claim 1, wherein the first end portion is directly affixed to the first cross member and the second end portion is directly affixed to the second cross member, and wherein the drive is powered by an existing power supply of a tractor or towing vehicle when electrical wiring of the trailer is connected to an electrical system of the tractor or towing vehicle.

5. The combination of claim 1, wherein the drive is disposed between and in line with the first and second cross members.

6. The combination of claim 1, wherein the drive comprises a housing, the first and second end portions of the first drive shaft extending through opposite sides of the housing.

7. The combination of claim 1, wherein the first end portion of the first drive shaft is directly affixed to the end of the first cross member and the second end portion of the first drive shaft is directly affixed to the end of the second cross member.

8. The combination of claim 1, wherein the first drive shaft is at least partially disposed within the drive.

9. The combination of claim 1, wherein the drive is mounted between the first cross member and the second cross member.

10. The combination of claim 9, wherein the first drive shaft is mounted between and generally coaxial with the first cross member and the second cross member.

11. A combination, comprising:
    a trailer;
    a first support member secured to said trailer;
    a second support member secured to said first support member, said second support member being telescopically received within said first support member and being movable between raised and lowered positions;
    a first cross member comprising a first pipe, said first pipe having first and second apertures passing therethrough;
    first means for moving said second support member between said raised and lowered positions upon rotation of said first cross member, said first cross member being operably connected to said first moving means;

a second cross member comprising a second pipe, said second pipe having first and second apertures passing therethrough;
a drive, said drive comprising:
    a motor; and
    a first drive shaft operably connected to said motor, said first drive shaft having first and second end portions, said first end portion having a first aperture passing therethrough and being affixed to said first cross member, said second end portion having a first aperture passing therethrough and being affixed to said second cross member;
the combination further comprising;
a first rigid member, said first rigid member being affixed within said first and second apertures of said first pipe and within said first aperture of said first end portion of said first drive shaft;
a second rigid member, said second rigid member being affixed within said first and second apertures of said second pipe and within said first aperture of said second end portion of said first drive shaft;
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, wherein said second cross member is operably connected to said second moving means.

12. A combination, comprising:
a trailer;
a first support member secured to said trailer;
a second support member secured to said first support member, said second support member being telescopically received within said first support member and being movable between raised and lowered positions;
a first cross member;
first means for moving said second support member between said raised and lowered positions upon rotation of said first cross member, said first cross member being operably connected to said first moving means;
a second cross member;
a drive, said drive comprising:
    a motor; and
    a first drive shaft operably connected to said motor, said first drive shaft having first and second end portions, said first end portion being affixed to said first cross member and said second end portion being affixed to said second cross member;
the combination further comprising:
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, said second cross member being operably connected to said second moving means, wherein said first cross member comprises a first pipe and wherein said second cross member comprises a second pipe, said first pipe having an outside diameter that is approximately 1.25 inches and said second pipe having an outside diameter that is approximately 1.25 inches.

13. A combination, comprising:
a trailer;
a first support member secured to said trailer;
a second support member secured to said first support member, said second support member being telescopically received within said first support member and being movable between raised and lowered positions;
a first cross member;
first means for moving said second support member between said raised and lowered positions upon rotation of said first cross member, said first cross member being operably connected to said first moving means;
a second cross member;
a drive, said drive comprising:
    a motor; and
    a first drive shaft having a plurality of pear teeth formed in an intermediate portion thereof, said first drive shaft being operably connected to said motor, and having first and second end portions, said first end portion of said first drive shaft being affixed to said first cross member and said second end portion of said first drive shaft being affixed to said second cross member;
the combination further comprising:
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, wherein said second cross member is operably connected to said second moving means.

14. A combination, comprising:
a trailer;
a first support member secured to said trailer;
a second support member secured to said first support member, said second support member being telescopically received within said first support member and being movable between raised and lowered positions;
a first cross member;
first means for moving said second support member between said raised and lowered positions upon rotation of said first cross member, said first cross member being operably connected to said first moving means;
a second cross member;
a drive, said drive comprising:
    a motor;
    a first drive shaft operably connected to said motor, said first drive shaft having first and second end portions, said first end portion being affixed to said first cross member and said second end portion being affixed to said second cross member;
    a second drive shaft operably connected to said motor;
    at least one gear operably connecting said second drive shaft to said first drive shaft; and
    a housing, wherein said motor, said second drive shaft, and said at least one gear are disposed within said housing, and at least a portion of said first drive shaft is disposed within said housing;

the combination further comprising:
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, wherein said second cross member is operably connected to said second moving means.

15. The combination of claim 14, wherein said first drive shaft is disposed substantially parallel to said second drive shaft and wherein the first drive shaft rotates at a lower rate than the second drive shaft.

16. A combination, comprising:
a trailer;
a first support member secured to said trailer;
a second support member secured to said first support member, said second support member being telescopically received within said first support member and being movable between raised and lowered positions;
a first cross member;
first means for moving said second support member between said raised and lowered positions upon rotation of said first cross member, said first cross member being operably connected to said first moving means;
a second cross member;
a drive disposed between and in line with the first and second cross members,
said drive comprising:
a motor; and
a first drive shaft operably connected to said motor, said first drive shaft having first and second end portions, said first end portion being affixed to said first cross member and said second end portion being affixed to said second cross member;
the combination further comprising:
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, wherein said second cross member is operably connected to said second moving means, and
wherein a gear reducing member is disposed near a second end of the second cross member generally in line with the drive and the first and second cross members.

17. A combination, comprising:
a trailer;
a first support member secured to said trailer;
a second support member secured to said first support member, said second support member being telescopically received within said first support member and being movable between raised and lowered positions;
a first cross member;
first means for moving said second support member between said raised and lowered positions upon rotation of said first cross member, said first cross member being operably connected to said first moving means;
a second cross member;

a drive mounted between the first and second cross members, said drive comprising:
a motor; and
a first drive shaft operably connected to said motor, said first drive shaft having first and second end portions, said first end portion being affixed to said first cross member and said second end portion being affixed to said second cross member, wherein the first drive shaft is mounted within a removed segment between and generally coaxial with the first cross member and the second cross member;
the combination further comprising:
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, wherein said second cross member is operably connected to said second moving means.

18. A combination, comprising:
a trailer;
a first support member secured to said trailer;
a second support member secured to said first support member, said second support member being telescopically received within said first support member and being movable between raised and lowered positions;
a first cross member;
first means for moving said second support member between said raised and lowered positions upon rotation of said first cross member, said first cross member being operably connected to said first moving means;
a second cross member;
a drive, said drive comprising:
a motor; and
a first drive shaft operably connected to said motor, said first drive shaft having first and second end portions, said first end portion being affixed to said first cross member and said second end portion being affixed to said second cross member, wherein a housing of at least a portion of the drive comprises a first aperture through a first side of the housing and a second aperture through a second side of the housing, the first and second sides of the housing being generally opposite and across the housing from one another, wherein the first drive shaft passes through the first and second apertures, and the first and second ends of the first drive shaft are disposed outside of the housing;
the combination further comprising:
a third support member secured to said trailer;
a fourth support member secured to said third support member, said fourth support member being telescopically received within said third support member and being movable between raised and lowered positions; and
second means for moving said fourth support member between said raised and lowered positions upon rotation of said second cross member, wherein said second cross member is operably connected to said second moving means.

* * * * *